United States Patent [19]
Ralli

[11] Patent Number: 5,926,293
[45] Date of Patent: Jul. 20, 1999

[54] HOLOGRAPHIC TRANSFLECTOR

[75] Inventor: Philip J. Ralli, Medford, Mass.

[73] Assignee: Polaroid Corporation, Cambridge, Mass.

[21] Appl. No.: 08/928,016

[22] Filed: Sep. 11, 1997

[51] Int. Cl.$^6$ .............................. G02B 5/32; G02B 5/02; G02F 1/1335
[52] U.S. Cl. .......................... 359/15; 359/599; 359/636; 349/64; 349/113
[58] Field of Search .............................. 359/15, 599, 636, 359/2; 349/64, 62, 113

[56] References Cited

U.S. PATENT DOCUMENTS

| | | | |
|---|---|---|---|
| 3,599,596 | 8/1971 | Remus et al. | 116/334 |
| 4,040,727 | 8/1977 | Ketchpel | 350/288 |
| 4,355,868 | 10/1982 | Perregaux et al. | 350/338 |
| 4,398,805 | 8/1983 | Cole | 350/345 |
| 4,541,692 | 9/1985 | Collins et al. | 350/339 |
| 4,630,894 | 12/1986 | Cremers | 350/338 |
| 5,128,779 | 7/1992 | Mallik | 359/2 |
| 5,418,631 | 5/1995 | Tedesco | 359/15 |
| 5,471,327 | 11/1995 | Tedesco et al. | 359/15 |
| 5,530,571 | 6/1996 | Chen | 349/113 |
| 5,594,560 | 1/1997 | Jelley et al. | 359/15 |
| 5,742,411 | 4/1998 | Walters | 359/2 |

FOREIGN PATENT DOCUMENTS

| | | | |
|---|---|---|---|
| 8-220534 | 8/1996 | Japan | G02F 1/1335 |
| WO95/12826 | 5/1995 | WIPO | G02B 5/32 |
| WO96/37805 | 11/1996 | WIPO | G02F 1/1335 |

OTHER PUBLICATIONS

J.M. Tedesco et al., "Holographic Diffusers for LCD Backlights and Projection Screens", SID International Symposium–Digest of Technical Papers, vol. 24, No. 1, May 1, 1993.

*Primary Examiner*—Jon Henry
*Attorney, Agent, or Firm*—Renato M. de Luna

[57] ABSTRACT

A light-diffusing holographic transflector comprising a holographic layer and a transflective layer is disclosed. The transflector is capable under good ambient lighting conditions of illuminating an LCD display element by holographic reflection, and under poor ambient lighting conditions, by the transmission therethrough of internal edge- or back-lighting. The transmission of light is accomplished to form a predetermined visually-perceptible image (e.g., graphics, designs, and logos) by the provision in said transflector of a corresponding pattern of light-transmitting microholes. The light-transmitting microholes are formed preferably by laser ablation or etching.

14 Claims, 1 Drawing Sheet

HOLOGRAPHIC TRANSFLECTOR

FIELD OF THE INVENTION

In general, the present invention relates to a patterned transflective holographic diffuser. More particularly, the present invention relates to a holographic transflector for use in an image-providing display element (such as a liquid crystal display element), the transflector provided with means for transmitting light therethrough in a predetermined pattern.

BACKGROUND OF THE INVENTION

Electro-optical display devices are the object of considerable research efforts. Of the various display systems that have been developed, thin flat-panel display devices utilizing, for example, liquid crystal components are of particular commercial interest.

Compositions characterized as liquid crystals include a wide range of materials. The different electrical and optical properties exhibited by these liquid crystalline materials make possible a number of mechanisms for light modulation. Such mechanisms include phase transitions, dynamic scattering, and field effects, all of which are well known in the art.

Field effect devices are of particular utility. The effect that is commercially most significant at present is the rotation of polarized light by a twisted nematic liquid crystal alignment and the disappearance of this effect when an electric field is applied across the device. Twisted nematic liquid crystal devices typically comprise a suitable liquid crystal composition confined in a cell between two optically transmissive plates, the plates having transparent conductive films affixed to their surfaces facing one another in the device. The alignment of the surface layers of the liquid crystal in the "off" state (i.e., the "open" state in most liquid crystal displays) of the device is determined by the interaction of the liquid crystal composition with the confining surfaces of the display device. The orientation of the surface layers of the liquid crystal is propagated throughout the bulk of the composition.

To effect orientation of a confined liquid crystal, the internal surfaces of the conductive plates of a sandwich display device can be prepared by unidirectionally rubbing the surfaces prior to fabrication of the device. The liquid crystal molecules immediately adjacent each rubbed surface tend to orient themselves in the same direction as the rubbing. By arranging the opposing conducting plates with the axis of the rubbed surface at, for example, right angles to each other, the liquid crystal molecules at points intermediate the two plates will orient themselves to a degree which is a function of the distance from the two plates. Accordingly, in this example, the liquid crystal will align itself in a continuous spiral path that twists through the 90° angle between the opposing plates.

If the light-rotating liquid crystal "sandwich" is mounted between two crossed light polarizer elements, then illuminated by an internal light component, polarized light will pass into the liquid crystal cell (i.e., in its "open" state) and be rotated through a 90° angle as it is transmitted through the twisted nematic crystal composition from one surface of the cell to the other. Due to the 90° light rotation effected by the twist of the liquid crystal, the polarized illumination light will be set to pass through the second crossed polarizer mounted downstream.

When an electric field is applied across the liquid crystal composition between the two conductive plates, the twisted orientation of the liquid crystal is obliterated as the molecules align themselves with the applied field. As the liquid crystal is untwisted, the polarized illumination light entering the device through the first polarizer will no longer be rotated 90° as it is transmitted through the liquid crystal. Therefore, the non-rotated light will be unable to pass through the second polarizer which is set correspondingly crossed to the first polarizer (i.e., the "closed" state). Selective application of voltages across discrete segments of the liquid crystal device can readily accomplish patterns of bright areas (no applied electric field) and dark areas (applied electric field).

In devices employing internally-illuminated LCD displays (e.g., wrist watches, calculators, personal digital assistants, cellular telephone displays, and laptop computers), backlighting and edge-lighting—when used—consume vigorously the power supply of said displays. To reduce reliance on such internal lighting systems, it has been found that displays adequately viewable under good ambient light can be provided by employing in said displays a reflective holographic diffuser. See, International Patent Application No. PCT/US96/06852 (Publication No. WO 96/37805)(Wenyon). See also International Patent Application No. PCT/US94/11818 (Publication No. WO 95/12826) (Chen et al.). In this role, the reflective holographic diffuser provides a bright illuminating background by the holographic modulation of available ambient light, rather than by energy-depleting electroilluminescence.

While holographically-illuminated liquid crystal displays accomplish good results in several applications, considerations of the possibility of use in poor ambient light conditions, has made desirable for certain display configurations the incorporation or retention of supplementary internal light sources. A problem arises because highly reflective layers of metal (e.g., aluminum) are employed in the manufacture of certain varieties of reflective holographic diffusers. When the holographic reflective diffuser in an LCD display is placed proximate the backside of the display's image-providing element, the highly reflective layer can block from a viewer the light propagated from the internal lighting source.

SUMMARY OF THE INVENTION

To solve in a desirable manner the aforementioned problem, a holographic transflector is employed comprising a holographic layer and a light-transflective layer, the transflective properties of said light-transflective layer being resultant of light-transmissive microholes arranged therein according to a predetermined pattern. Placed proximate an LCD display element, the holographic transflector is capable under good ambient lighting conditions of illuminating the LCD element by holographic reflection, and under poor ambient lighting condition, by the transmission therethrough of light propagated from an edge- or back-lighting assembly. In a preferred embodiment, the predetermined pattern of microholes forms an image (e.g., graphics, designs, and logos), the image and non-image areas thereof being differentiated by the frequency or relative aperture of said microholes in those areas. The light-transmitting microholes are formed preferably by laser ablation or etching.

The principal object of the present invention is to provide a display capable of presenting to a viewer an addressable dominant foreground image superimposed over a relatively fainter (but nonetheless perceptible) static graphical background.

Another object of the present invention is to provide a holographic transflector for use in combination with an image-providing display element, the transflector provided with means for transmitting light therethrough in a predetermined pattern.

Another object of the present invention is to provide a display capable of presenting a brightly illuminated viewing zone by the diffuse reflection of ambient light in good lighting conditions and, in poor lighting conditions, by the diffuse transmission of light propagated from an internal electroillumination source through the microholes of an otherwise reflective layer.

Another object of the present invention is to provide a method of making a holographic transflector, wherein a layer of reflective metal (such as aluminum) is deposited onto a light-modulating hologram, followed by the removal of plugs of said reflective layer in a predetermined pattern by laser ablation or laser etching.

Another object of the present invention is to provide a liquid crystal display having a liquid crystal display element backed with a holographic transflector.

Other features and advantages of this invention will become apparent from the following detailed description, taken in conjunction with the accompanying drawing.

The relative locations, shapes, and sizes of objects in the Figures are exaggerated to facilitate discussion and presentation herein.

DETAILED DESCRIPTION OF THE INVENTIVE SUBJECT MATTER

Figure 1:
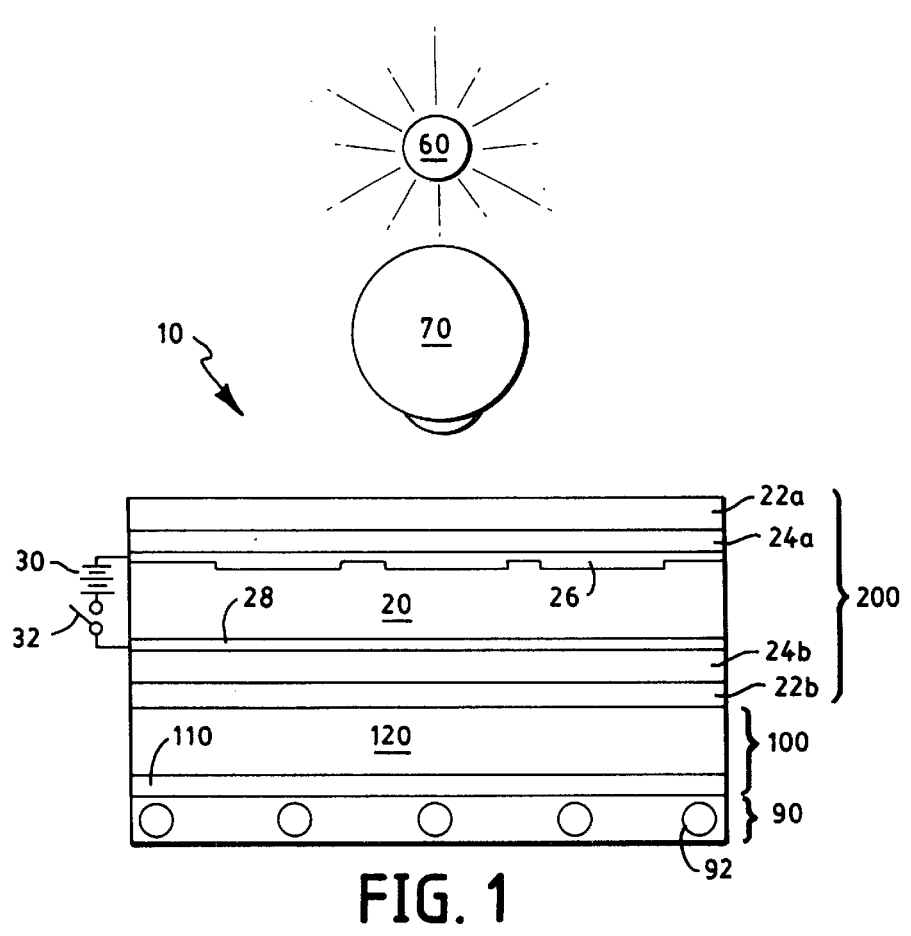
FIG. 1 provides a schematic illustration of a liquid crystal display 10 comprising an LCD element (or "stack") 200 backed with a holographic transflector 100, the liquid crystal display 10 viewable in the illumination provided by either an ambient source 60 or by an internal backlighting element 90.

The present invention provides a display 10 capable of presenting to a viewer 70 an image illuminated passively (in good ambient light conditions) by holographically reflected ambient light and actively (in low ambient light conditions) by the transmission of light from an internal light source 90. Referring to FIG. 1, the display 10 comprises three component parts: an image-providing display element 200, a holographic transflector 100, and internal illumination means 90. Key to display 10's functionality is its holographic transflector 100, a component comprising a holographic layer 120 and a "patterned" transflective layer 110.

The image-providing display element 200 can be any component capable of providing an image viewable by the transmission of light therethrough. Examples of such display components include, but are not limited to addressable electrooptical devices, such as liquid crystal display elements and electrophoretic display elements. Also possible are static light-transmissive displays, such as binary images provided on a light-transmissive substrate and photographic slides. The preferred display is the liquid crystal display element.

As shown in FIG. 1, the holographic transflector 100 is positioned proximate to display 200's back side. As used herein, the term "proximate" refers to the relation between the display element 200 and the holographic transflector 100, and the positioning of such elements in a contiguous, i.e., face-to-face relation, or in a separated (spaced-apart) relation. The space between the separated elements can be held in spaced-apart relation by frame means (not shown) adequate to hold the elements as a unitary structure. Alternatively, such elements can be joined to one another through one or more thin layers or substrates. For example, a plastic substrate, additionally carrying coated or other layers, can be employed as a suitable support material for carrying on each of the respective sides thereof the image-providing display element 200 and the holographic transflector 100, respectively, affixed directly to such substrate or indirectly through adhesive or other layers.

In respect of its reflective properties, the holographic transflector 100 receives light traversing the image-providing display element 200 and redirects it back to the image-providing display element 200 from its back side. In respect of its transmissive properties, the transflective layer 110 thereof is provided with a predetermined pattern of light-transmissive microholes. See, FIG. 2. Activation of the internal illumination means 90 causes light to pass through holographic transflector 100 through the microholes, thereby illuminating image-providing display element 200.

In respect of said predetermined pattern, it is preferred that the microholes be distributed conservatively relative to the requirements of a particular application to prevent undesirable degradation of reflectivity. Inasmuch as adequate illumination can be accomplished in dark lighting conditions with relatively small light intensities, the total surface area occupied by microholes need not be excessive. Accordingly, since far greater surface will be covered by the transflective layer 110 relative to that of its microholes, most of the incident light will be reflected back towards the viewer 70 with only a small portion of the light passing through the microholes and thereby lost. The reflected light thus remains sufficiently intense to permit a display located generally above the transflector to be adequately illuminated.

The internal illumination means 200 can be configured as a conventional backlighting assembly, for example, wherein—as shown in FIG. 1—internal illumination means 200 is provided as a sinuous fluorescent tube 92. In such configuration, the various sections of fluorescent tube 92 should be spaced to provide a uniform dispersal of light matched to the optical properties of holographic transflector 100. Other suitable backlighting assemblies would include electroluminescent panels and backings, the several varieties thereof being well-known in the art.

Figure 3:
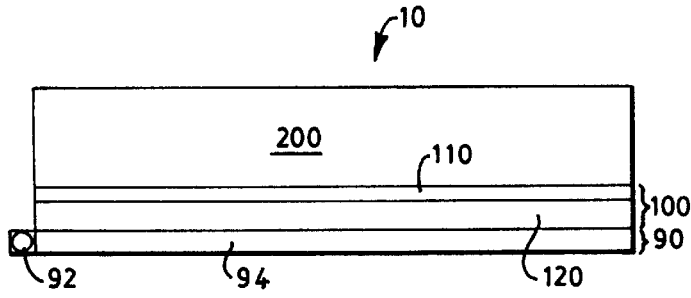
FIG. 3 provides a schematic illustration of an embodiment of the present invention, wherein a light-transflective layer 110 of holographic transflector 120 is interposed between an embossed surface hologram 120 and LCD element 200.

Alternatively, as shown in FIG. 3, an optical lamp 92 can be provided to illuminate the image-providing display element 200 through an edge thereof. The lamp 92 may be of any suitable type which provide uniform illumination. Reflectors are desirably provided to concentrate the light laterally toward opposing edges, whereupon its transit through a suitable waveguide 94 disperses said light uniformly towards a substantially normal incidence upon display element 200. Examples of such edge-lighting components can be found in U.S. Pat. No. 5,418,631, issued to Tedesco on May 23, 1995; U.S. Pat. No. 4,989,956, issued to Wu et al. on Feb. 5, 1991, and U.S. Pat. No. 4,914,553, issued to Hamada et al. on Apr. 3, 1990.

In a preferred embodiment, the light-transflective layer 110 comprises a deposited layer of reflective metal; in which case, the light-transmissive microholes are formed by laser-induced removal of portions (cf., "plugs") of said layer. While other means of removing microhole-sized portions are possible, the use of a very thin intense laser beam allows removal of desirably small portions, portions having an aperture sufficient to admit the transit of adequate light therethrough, but remain barely perceptible to a viewer 70. Since the microholes will upon passage of light therethrough effect a light-diffracting "pinholing effect", employment of appropriately-sized microholes can assist desirably in the diffusion of light in the forward direction of internal illumination.

To illuminate in transmission the entire display, the microholes are desirably provided throughout the area of the light-transflective layer 110 corresponding to the predetermined viewable extents of the display 10. This continuous background distribution of microholes assures complete transflective coverage throughout the entire viewable area of the display 10, i.e., apart from areas that may have an imagewise distribution of microholes. This background distribution can be either an ordered arrangement or a random stochastic dispersal. Because the former may under certain conditions result in undesirable optical effects, the stochastic pattern is preferred.

The shape of the microholes is not critical. They can be squarish, dot-like (cf., a pixel), linear (e.g., a grating pattern), or irregular in shape. However, inasmuch as the preferred method of generating the microholes is by laser ablation—cf., digital imaging—the aperture of the microholes will in most cases be dot-like.

Figure 2:
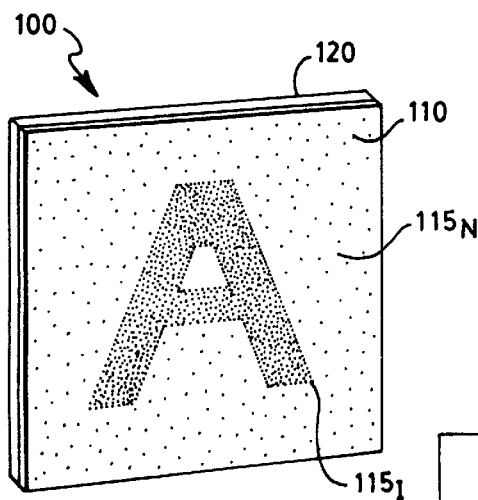
FIG. 2 provides a schematic illustration of a holographic transflector 100 according to one embodiment, wherein said holographic transflector 100 is provided with an image-forming pattern of microholes, the pattern comprising image areas $115_I$ and non-image areas $115_N$.

While for certain embodiments it is possible for the microholes to be left arranged in a homogenous uniform distribution throughout the predetermined extents of the viewable portion of display 10, the principal objectives of the present invention are accomplished by arranging the microholes in an image-forming pattern. For example, as shown in FIG. 2, the holographic transflector 100 is provided with microholes arranged to differentiate image areas $115_I$ and non-image areas $115_N$, particularly by varying the frequency of similarly-sized microholes. Alternatively, rather than modulating microhole frequency, imagewise differentiation can be accomplished by varying the size (i.e., aperture) of the microholes in the image and non-image areas. Because large microholes may for certain applications be too distinctly perceptible to a viewer, frequency-modulated patterns are preferred.

The various images that can be employed in the transflector are several. For example, to add aesthetic value or to enhance product differentiation in a resultant display, the image can be, for example, a corporate logo or trademark, or a fanciful graphical design. Such background image would be desirable in, for example, the displays of pagers, cellular telephones, so-called "personal digital assistants" (PDAs), promotional products, and—perhaps to a lesser extent—LCD watch displays. Alternatively, the image can be functional, for example, text, symbols, or icons, which—when the internal illumination means 90 is activated—can present additional information to viewer 70 in combination with or without the superimposition of data presented by display element 200. Such functionality can provide advantage when used in, for example, vehicle dashboard displays.

Although the present invention is not limited to any particular display format, in the principal and preferred embodiment, the display 10 is configured as a liquid crystal display. As shown in FIG. 1, the liquid crystal display 10 employs a liquid crystal display element 200 as the aforementioned image-providing display element. The representative LCD element shown comprises a liquid crystal cell 200, a plurality of selectively actuatable electrode segments 28 and 26, and first and second polarizers 22a and 22b on front and rear sides of the cell.

As used herein, the term "liquid crystal" is used to refer to molecules with anisotropic geometry, such as rod-shaped or disc-shaped, that exhibit stable states intermediate between liquid and solid, and which have comparatively low molecular weights. While discussed primarily with reference to twisted nematic liquid crystals, the liquid crystal medium of the present invention may contain any such liquid crystal compound useful in liquid crystal displays, or mixtures of such liquid crystal compounds. Useful are thermotropic liquid crystals which exhibit nematic and smectic (including ferroelectric) phases. Nematic phases include conventional uniaxial nematics, twisted nematics, and cholesteric mesophases.

Liquid crystal display element 200 also includes a first optically transmissive plate 24a supporting a conductive element 26 on its interior surface. Plate 24a may be made of any suitable transparent or translucent sheet material including glass, plastic, and the like. Conductive element 26 can be made from any conductive material of suitable optical quality; transparent conductive coatings of metallic oxides, such as tin oxide, are well known in the art. Set opposite plate 24a is a second optically transmissive plate 24b, which also includes on its surface, facing plate 24a, a conductive layer 28. Plate 24b and conductive layer 28 may be composed of the same materials as plate 24a and conductive element 26. Sandwiched between the two plates is a layer of a twisted nematic liquid crystal composition 20. Set on either side of the sandwich arrangement are front polarizer 22a and rear polarizer 22b whose polarizing axes are disposed at right angles to each other.

Conductive coatings 26 and 28 are connected by suitable electrical leads so that a voltage can be applied across liquid crystal composition 16 by means of an electrical source 30. The schematic diagram illustrates only one element 30 connected to the electrical source, but means are commonly available in the art for selectively activating each of the image elements for forming the desired display.

In order to effect the desired twist to the confined nematic light crystal composition, the interior conductive surfaces of plates 24a and 24b are unidirectionally rubbed, the axes of the rubbed surface offset (e.g., at an angle of 90°, or 45° in so-called quarter-wave plates) from each other.

Light entering the front of the display device through the front polarizer 22a will pass through optically transmissive plate 24a and conductive coating 26 and enter the liquid crystal composition layer 20, the polarized beam of light will follow the twist formed in the liquid crystal and be rotated at the offset angle, so that upon reaching the correspondingly crossed polarizer 22b, after passing through the second optical transmissive plate 24b and conductive layer 28, the light will be transmitted through the polarizer to be reflected by holographic transflector 100. The reflected light, retracing the same route in reverse, will pass through the sandwich arrangement and be readily reversed.

The polarizers 22a and 22b may comprise any of a variety of materials which produce the desired light-polarization effects. Preferred, and the most widely used type of synthetic polarizer, is the polyvinyl alcohol-iodine complex polarizer; it comprises a unidirectionally stretched, linearly oriented polyvinylalcohol sheet, supported on a suitable transparent, isotropic plastic material (e.g., cellulose acetate butyrate), and stained with a polyiodide solution. Such polarizers are commonly available from Polaroid Corporation as type H polarizer sheet, varieties thereof being described in U.S. Pat. Nos. 2,173,304; 2,255,940; 2,306,108; 2,397,231; 2,445,555; 2,453,186; and 2,674,159.

Alternatively, a synthetic polarizer based on a polyvinylene-based chromophoric species can also be employed. Such "K-Sheet"-type polarizers are made by converting (i.e., rendering dichroic) the polyvinylalcohol molecules of a polyvinylalcohol sheet to polyvinylene light-polarizing species by catalytic dehydration, typically using hydrochloric acid vapor in the manner described in U.S. Pat. No. 2,445,555 (issued Jul. 20, 1948 to F. J. Binda). See also International Patent Application No. PCT/US96/18400 (Publication No. WO97/21123 (Trapani et al). Due to the good humidity resistance of such polyvinylene-based polarizers, their use is desirable for applications involving exposure to adversely humid or moist environmental conditions.

In addition to the embodiments discussed above, one skilled in the art can modify the liquid crystal display element 200 to incorporate therein compensatory coloring material, such as described in U.S. patent application Ser. No. 08/810,695, filed by John C. Branca et al. on Feb. 28, 1997. For example, an appropriate compensatory amount of tints, dyes, and/or pigments can be deposited on either the front or back surfaces of the element 200, or can be included in the manufacture of one of its component layers, e.g., optically transmissive plates 24a and 24b, or can be included in an interlaminar adhesive layer (not shown).

In FIG. 1, the holographic transflector 100 is positioned proximate to the liquid crystal display element 200. While a comparatively thin (and thereby desirable) liquid crystal display is accomplished by affixing (e.g., by use of a optical adhesive) the holographic transflector 100 directly onto a liquid crystal display element 200, the diffuser need not be used in such manner to achieve the goals of the present invention. For example, in certain embodiments, it is envisioned that an optically transmissive spacer layer (e.g., an air void, or a light attenuating filter) may be interposed between holographic transflector 100 and liquid crystal display element 200. Although holographic transflector 100 and light crystal display element 200 would be non-contiguous, they are for the present invention considered proximate.

As schematically depicted, the holographic transflector 100 comprises a light transflective layer 110 deposited (adhered, or otherwise fixed or mounted) onto holographic layer 120. As with the relative positioning of the liquid crystal display element 200 and the holographic transflector 100, while a comparatively thin (and thereby desirable) holographic transflector is accomplished by direct deposition of a light reflective layer onto said holographic layer—when the holographic layer 120 is not based on an embossed hologram—such direct deposition is not presently contemplated as necessary to achieve the goals of the present invention. For example, to add rigidity to a flexible volume-phase hologram, it is envisioned that an optically transparent support (not shown) may be interposed between light layer 110 and the holographic layer 120.

Light transflective layer 110—typically a metal or metal-containing layer—may be composed of, for example, an aluminum vapor-deposited polyester film having a thickness of 100 $\mu$m. In general, however, light transflective layer 110 can be prepared—as is well known in the art—from compositions comprising reflective metals and/or pigments dispersed in a suitable macromolecular organic binder. Additives, sensitizers, photoabsorbers, and the like can be included in the composition to modify or otherwise effect its actinic properties, such as to render a deposited layer thereof more amenable to laser ablation or etching processes.

While highly reflective metallic pigments provide comparatively better reflectivity in embodiments utilizing pigment dispersions, it is envisioned that for certain purposes other less reflective pigments may be contemplated, such as titanium dioxide, zinc oxide, zinc sulfide, lead carbonate, carbon white (i.e. fluorinated carbon black), polymers with encapsulated air voids, calcium carbonate, calcium sulfate, antimony oxide, magnesium carbonate, strontium sulfate, barium sulfate, barium carbonate, calcium silicate, and silicon oxide.

Any binder medium capable, on drying, of effectively "holding" the selected pigments in a substantially uniform dispersion can be used. A wide choice of binders can be employed, favorable coatability and lack of optical interference being important selection criteria. Other factors that should be considered in binder selection are desired coating viscosity, moisture resistance of the dried coating, coating durability, an advantageous solvent system, and the like. Preferably, a binder medium should have a low refractive index. Macromolecular binders that can be used include: vinylidene chloride copolymers (e.g., vinylidene chloride/acrylonitrile copolymers, vinylidene chloride/methylmethacrylate copolymers and vinylidene chloride/vinyl acetate copolymers); ethylene/vinyl acetate copolymers; cellulose esters and ethers (e.g., cellulose acetate butyrate, cellulose acetate propionate, and methyl, ethyl benzyl cellulose); synthetic rubbers (e.g., butadiene/acrylonitrile copolymers; chlorinated isoprene and 2-chloro-1,3-butadiene polymers); polyvinylesters (e.g. vinyl acetate/acrylate copolymers, poly(vinyl acetate) and vinyl acetate/methylmethacrylate copolymers); acrylate and methacrylate copolymers (e.g., polymethylmethacrylate); vinyl chloride copolymers (e.g., vinyl chloride/vinylacetate copolymers); and diazo resins such as the formaldehyde polymers and copolymers of p-diazo-diphenylamine. Further, depending on the binder and reflective pigment utilized, the reflective layer formulations can also include surfactants, dispersal agents, and/or plasticizers.

To provide the holographic layer 120 in a typical embodiment, an object (or the surface thereof) having the desired optical properties (e.g., light diffusing properties) is holographically recorded in a holographic medium as an interference pattern (e.g., a fringe pattern or surface relief pattern) provided by the combination of an object beam and a reference beam in the holographic medium. For example, during recordation of a holographic diffuser, an object beam impinges upon the holographic medium subsequent to interruption by a suitable light diffusing object (or surface thereof), such as ground glass or white tile. At the same time, a reference beam uninterrupted by the object and coherent in respect of said object beam impinges upon the holographic medium from either the same side (i.e., to produce a holographic transmission diffuser) or from opposite sides (i.e., to produce a holographic reflection diffuser). In accomplishing recordation, both on-axis and off-axis exposure geometries may be implemented. Additional details regarding holographic recordation can be found in the aforementioned PCT/US96/06852 (Wenyon) and PCT PCT/US94/11818 (Chen et al.), as well as Japanese Patent Application No. 8-220534, laid-open Aug. 30, 1996 (Shoichi Takeuchi).

The exposure time may be readily determined by routine testing, as is well known in the art, and will vary according to the intensity of the exposing radiation, the distance from the object to the recording media, and like factors. These factors may be varied as necessary to change the exposure duration, either shorter or longer, as desired to obtain the preferred combination of exposure duration and light intensity for a given recordation. It will be appreciated that in the formation of a volume phase hologram on DMP-128 (a proprietary holographic medium manufactured by POLAROID CORPORATION), a subsequent non-imagewise or flood exposure to white light is useful to "fix" the photopolymerizable layer.

In the design of the holographic layer 120, it will be appreciated that the performance of the display 10 for viewing by an observer 70 is dependent upon the brightness and resolution of the image as perceived by a person in a particular angular position. In displays employing conventional reflectors, oftentimes the brightness of the image in a particular portion of the screen varies with the viewer's position. The screen is not at the same brightness over the whole area, and the distribution of light on the screen makes it difficult for the viewer to observe all parts of the viewing screen and extract information therefrom with reliability. Accordingly, to gain advantage from the optical design flexibility provided by holographic manufacturing processes, in the design of holographic layer 120, it is desirable to define an output cone ("zone", or "pupil") through which the majority of the light from the display screen is propagated. When light can be propagated toward such defined output cone, with little scattering elsewhere, then brightness is controlled and enhanced ("gain") because less light is "wasted" to scattering. Additionally, it will be noted that a decrease in "pupil size" will result in a proportional increase in "gain". Advantage from such relation is obtained, for example, in displays designed with a comparatively reduced viewing zone. Such viewing zone would have good brightness and enhanced viewing privacy.

While a holographic transflector 100 capable of producing (by reflection) an output cone of diffused light having gain within predetermined angular ranges is desirable, such embodiment is not limited to any particular predetermined optical characteristic of the holographic diffuser 120. Holographic diffusers having any variety of light diffusing functionality can be utilized depending on the requirements of particular applications. As evident from the literature, species of holographic diffusers are several and various. See e.g., S. Waddle, et al, Holographic Diffusers, OPTICAL ENGINEERING, Vol. 33, No. 1, p.213 et seq. (January 1994); D. Meyerhofer, Holographic and Interferometric Viewing Screens, APPLIED OPTICS, Vol. 12, No. 9, p.2180 et seq. (September 1973); J. M. Tedesco, et al, Holographic Diffusers for LCD Backlights and Projection Screens, SID 93 DIGEST, Ch. 5.3, p.29 et seq. (1993). See also, U.S. Pat. No. 5,365,354 (Jannson et al.) and U.S. Pat. No. 5,046,793 (Hockley et al). The teachings found in these and other like references can be utilized in embodiments of the present invention by those skilled in the art in view of the teachings disclosed herein.

Recording media used for holographic layer 120 in the present invention can be made of a variety of materials. Among the more important are: silver halide emulsions, hardened dichromated gelatin, ferroelectric crystals, photopolymers, photochromics, and photodichroics. Characteristics of these materials are given in *Volume Holography and Volume Gratings*, by L. Solymar and D. J. Cook, Chapter 10, Academic Press, New York, 1981, pages 254–304. Compositions that may be considered for use include DMP-128 (a proprietary photopolymer from Polaroid Corporation), dichromated gelatin, silver-halide based compositions, and compositions described in U.S. Pat. No. 4,588,664, issued to F. L. Fielding and R. T. Ingwall on May 13, 1986, and U.S. Pat. No. 4,696,876, issued to J. J. Cael on Sep. 29, 1987. For volume-phase holograms, DMP-128 is the preferred material and generally comprises a dye sensitizer, a branched polyethylenimine, and a free radical polymerizable ethylenically unsaturated monomer. Particular details of the composition may be found in the aforecited U.S. Pat. No. 4,588,664. See also, W. C. Hay and B. D. Guenther, "Characterization of Polaroid's DMP-128 Holographic Recording Medium", *Proceedings of the SPIE*, 883, pp. 102–105 (1988). Certain details relating to the use of DMP-128 for the production of transmission holographic diffusers may be found in M. Wenyon and P. Ralli, Mass Production of Volume Holographic Diffusers, 1994 SID INTERNATIONAL SYMPOSIUM DIGEST OF TECHNICAL PAPERS, San Jose, Calif. (Jun. 14–16, 1994) (ISSN 0097-966X).

The coating thickness of the photoactivatable composition is not particularly critical and can be selected according to the features and aspects desired in the resultant hologram. Illustratively, for example, the dry thickness of the layer of photopolymerizable composition based on DMP-128 will be about 2–10 microns, although coatings may be as thick as 25–30 microns for certain applications.

Subsequent to its exposure, the recording medium can then be processed to develop the recorded latent interference pattern and thereby produce a hologram. In a particular mode of practice, the recording medium is developed, for example, to intensify the imaged element (such as by treatment with 2-isopropanol in the case of DMP-128), or to "fix" (or otherwise make more stable) photopolymeric reaction products (cf., fringe structures) actinically generated by the irradiation. Certain details concerning the use and processing of photopolymerizable compositions used for holographic recordings can be found, for example, in U.S. Pat. No. 4,588,664, issued to H. L. Fielding and R. T. Ingwall on May 13, 1986; U.S. Pat. No. 4,696,876, issued to J. J. Cael on Sep. 27, 1987, and U.S. Pat. No. 5,198,912, issued to R. T. Ingwall, M. A. Troll, and D. H. Whitney on Mar. 30, 1993. Those skilled in the art will know of the various methods for processing the various types of recording media that can be used in the present invention. It will be appreciated that subsequent processing will depend on the nature of the selected recording medium. Accordingly, construction of the term "development" will compel consideration of the processes desired and/or required to finalize, or otherwise prepare for use, a particular imaged recording medium.

For the present invention, it is not required that holographic layer 120 be prepared as a volume hologram. Holographic layer 120 may also be prepared as a light-transmissive layer having a holographically produced "surface relief" pattern. When "backed" with, for example, a conforming reflective film, with said reflective film provided with a predetermined pattern of microholes, the resultant embossed transflective hologram may be deposited onto the liquid crystal display element in the same manner as a "volume-phase"-based holographic transflector.

An embossed transflective hologram is typically formed from an off-axis master hologram in a multi-step process. The first step usually involves making the master off-axis hologram where the desired light-modulating object is positioned some distance from the surface of the recording medium and the reference beam is a collimated or parallel beam. The second step usually involves exposing the master off-axis hologram with a collimated beam of light to project a real image of the object into space.

A second hologram is then made by positioning a new recording medium at the position of the projected real image and by introducing a new reference beam at an angle. In making embossed holograms, the recording medium used in this second step is typically a photoresist. A suitable photoresist would be one which, when holographically exposed and developed, yields a surface profile whose depth is proportional to the intensity of the incident irradiation.

The third step of making an embossed transflective hologram usually involves coating the surface of the holographic photoresist exposed in the second step with a conducting metal, such as silver, then immersing the coated hologram in an electroplating bath to plate a layer, such as a layer of nickel, thereon. The fourth step involves using the nickel plate layer as a hard master to emboss the interference pattern into plastic that has been softened by heat, pressure, solvents, or some combination thereof in a continuous fashion After embossing, the embossed surface relief pattern is coated with a highly reflecting metal, like aluminum. For the purposes of the present invention, such highly reflective metal coating is construed as the light reflective layer 110. Good reflective reconstruction is accomplished when the reflective layer closely corresponds with the "topography" of the embossed surface relief pattern. Provided with such "form-following" reflective layer, the resultant embossed hologram may be applied in accordance with the present invention with the reflective layer either facing toward or facing away from the image-providing display element, the former being preferred. In the latter case, the conforming reflective layer is exposed, susceptible to physical damage (e.g., scratches, abrasions, and the like), and accordingly, is desirably protected with, for example, a durable protective overcoat.

Finally, after depositing said layer of reflective metal, a laser is employed to remove portions of said layer of reflective metal to form a predetermined pattern of light-transmissive microholes. Laser removal—as mentioned above—is accomplished by techniques used in the known fields of laser ablation and laser etching.

Those skilled in the art, having the benefit of the teaching of the present invention set forth herein, can effect numerous modifications thereto. These modifications are to be construed as being encompassed within the scope of the present invention as set forth in the appended claims. For example, the disposition of the individual polarizer elements within a twisted nematic liquid crystal display can readily be modified to assume a parallel rather than a crossed relationship. In this arrangement, display areas across which an electric field is applied will appear bright from reflected light and areas not affected by an electric field will remain dark. Further although the present invention has been described primarily in conjunction with liquid crystal electrooptical display devices, it is reemphasized that the present invention is not limited to such particular devices. Utility provided by the incorporation of a holographic transflector extends to any other illuminated electrooptical device, including electrochromic, electrophoretic, electrolytic, and the like, as well as to any other displays capable of providing an image viewable by the transmission of light therethrough.

I claim:

1. A display comprising:

an image-providing display element having a front side for viewing and a back side opposite the front side;

a light-diffusing holographic transflector proximate the element's back side and comprising a holographic layer and a light-transflective layer, the holographic transflector capable of receiving light traversing said image-providing display element from said front side and redirecting light with gain back through said image-providing display element from said back side, the light-transflective layer provided with a predetermined image-forming pattern of light-transmissive microholes; and illumination means for producing and directing light toward said image-providing display element through said holographic transflector.

2. The display of claim 1, wherein the display element is a liquid crystal display element, the liquid crystal display element having an arrangement of front and rear light polarizers, front and rear optically-transmissive plates, a layer of twisted nematic liquid crystal composition confined between said plates, and means to impose a voltage at selected portions of said liquid crystal layer.

3. The display of claim 1, wherein the holographic layer comprises a volume-phase transmission hologram.

4. The display of claim 1, wherein the holographic layer comprises a surface transmission hologram.

5. The display of claim 1, wherein the holographic layer comprises a volume phase reflection hologram.

6. The display of claim 1, wherein said light-transflective layer comprises a deposited layer of reflective metal and said light-transmissive microholes are formed by laser-induced removal of portions of said layer of reflective metal.

7. The display of claim 6, wherein said removal is accomplished by laser ablation.

8. The display of claim 1, wherein image areas and non-image areas of said image-forming pattern are differentiated by the frequency of said microholes in those areas.

9. The display of claim 1, wherein image areas and non-image areas of said image-forming pattern are differentiated by the aperture of said microholes in those areas.

10. The display of claim 3, wherein the holographic transmission diffuser is prepared from a photopolymeric formulation comprising a dye sensitizer, a branched polyethylenimine, and a free radical polymerizable ethylenically unsaturated monomer.

11. The display of claim 3, wherein the volume-phase transmission hologram is achromatic.

12. The display of claim 4, wherein the surface transmission hologram is achromatic.

13. The display of claim 2, wherein the light-transflective layer is deposited directly onto the holographic transmission diffuser, and the reflective holographic diffuser is affixed directly to the liquid crystal display element.

14. The display of claim 2, wherein both front and rear light polarizers comprise sheets of unidirectionally-stretched polyiodide.

* * * * *